United States Patent
Wireman

[15] 3,705,480
[45] Dec. 12, 1972

[54] DEHYDRATOR FOR GASEOUS FLUIDS

[72] Inventor: Wallace M. Wireman, 3514 Handman Ave., Cincinnati, Ohio 45226

[22] Filed: Feb. 6, 1970

[21] Appl. No.: 9,334

[52] U.S. Cl. .....................55/275, 55/316, 55/323, 55/389
[51] Int. Cl. ....................................B01d 50/00
[58] Field of Search........55/316, 274, 337, 275, 320, 55/321, 387–389, 323, 219, 432, DIG. 17

[56] References Cited

UNITED STATES PATENTS

| | | | |
|---|---|---|---|
| 2,096,851 | 10/1937 | Fricke | 55/319 |
| 3,505,783 | 4/1970 | Graham | 55/275 |
| 2,728,407 | 12/1955 | Squier | 55/387 |
| 3,246,758 | 4/1966 | Wagner | 55/387 |
| 3,358,428 | 12/1967 | Mann | 55/387 |
| 3,418,789 | 12/1968 | Hoffman et al. | 55/219 |
| 3,464,186 | 9/1969 | Hankison et al. | 55/316 |
| 3,527,027 | 9/1970 | Knight et al. | 55/316 |
| 3,555,787 | 1/1971 | Lustig | 55/261 |

OTHER PUBLICATIONS

Gas–Dry Filter Trap Chemical Research Services, Inc. Addison Illinois one page dated 2/17/69

*Primary Examiner*—Bernard Nozick
*Attorney*—J. Warren Kinney, Jr.

[57] ABSTRACT

The dehydrator for gaseous fluids incorporates in its desiccant bed a quantity of color change dew point indicating material. Said indicating material may be distributed at random throughout the desiccant bed, or it may be incorporated as one or more layers or strata. When distributed at random, the color change dew point indicating material furnishes a progressively continuous indication of the moisture content of the desiccant bed, by means of a gradually advancing color line moving toward a terminal indication at which the condition of the desiccant is regarded as spent, or saturated with moisture. The color line is visible through transparent portions of the dehydrator.

10 Claims, 6 Drawing Figures

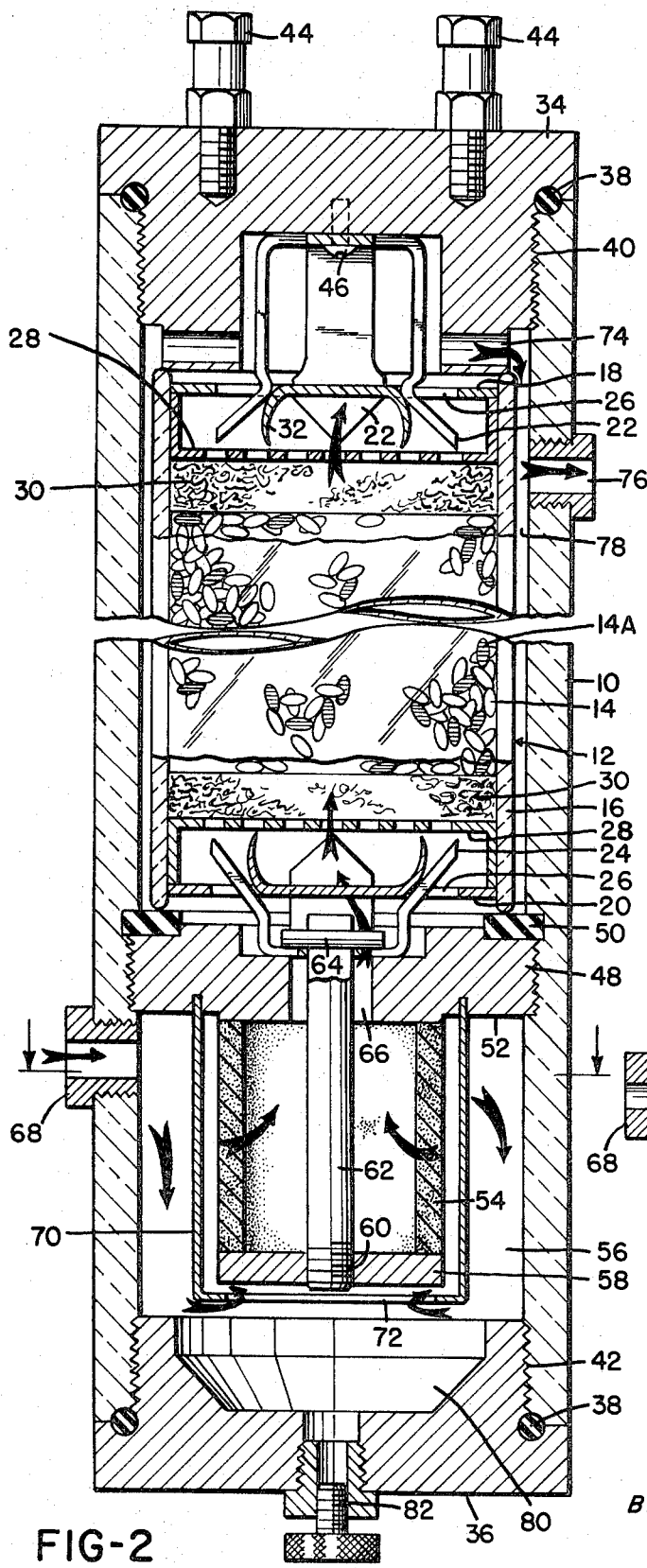
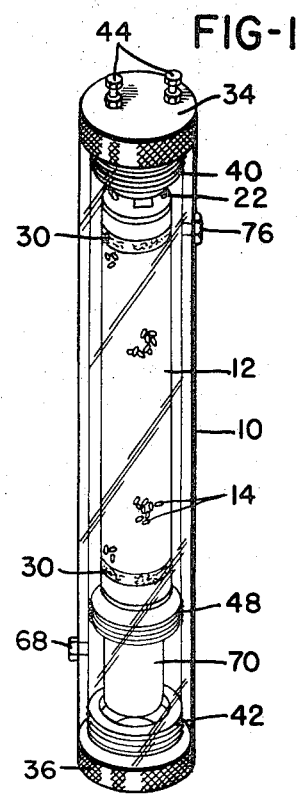
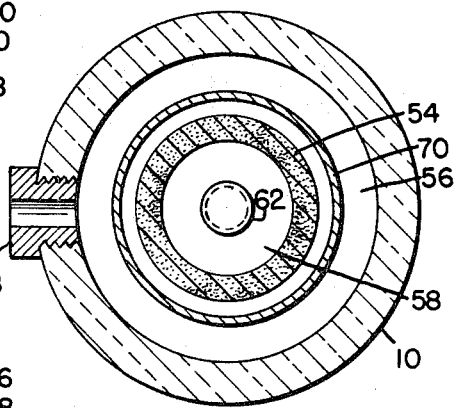
PATENTED DEC 12 1972
3,705,480
SHEET 1 OF 2
FIG-1
FIG-2
FIG-3
INVENTOR
WALLACE H. WIREMAN
BY J. Warren Kinney Jr.
ATTORNEY

INVENTOR
WALLACE H. WIREMAN

DEHYDRATOR FOR GASEOUS FLUIDS

The present invention relates to improvements in a dehydrator for gaseous fluids, including air to be used for various purposes.

An object of the invention is to provide a dehydrator characterized by great efficiency and convenience of usage.

Another object of the invention is to provide in a dehydrator, improved means for indicating the moisture content and the condition of the desiccant within the dehydrator.

Another object is to provide a dehydrator of the disposable cartridge type, incorporating various structural improvements which enhance the efficiency, durability, and serviceability of the device.

A further object of the invention is to provide in a dehydrator, means whereby the level of moisture content of the desiccant within the dehydrator may be rendered readily visible to the eye of an observer, or easily sensed by a measuring instrument.

The foregoing and other objects are attained by the means described herein and illustrated upon the accompanying drawings, in which:

FIG. 1 is a perspective view of a dehydrator for gaseous fluids, embodying the improvements of the present invention.

FIG. 2 is a vertical cross-section of the same.

FIG. 3 is a transverse cross-section taken on line 3—3 of FIG. 2.

Figure 4:
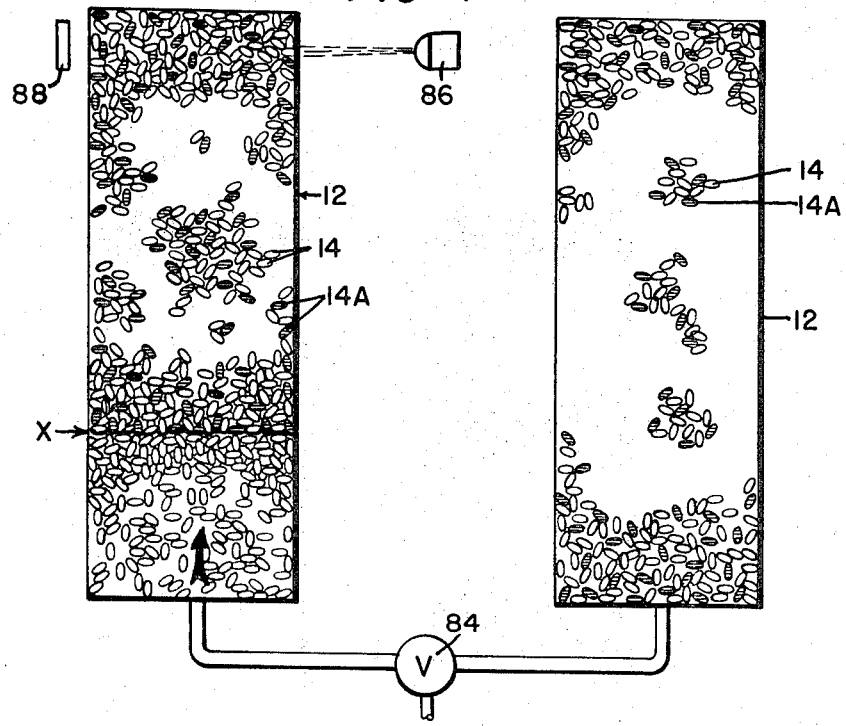
FIG. 4 is a side elevational view showing diagrammatically a method of utilizing two desiccant beds in a dehydrating system, wherein one bed undergoes reactivation, while the other performs the dehydrating function with visual indication of its performance.

With reference to FIGS. 1, 2 and 3, the dehydrator of this invention may comprise an elongate tubular casing 10 formed preferably of a translucent or transparent material, either wholly or partially, so as to expose to view an interior container or cartridge 12 containing a desiccant or drying agent 14. The container or cartridge 12 may be constructed of an elongate transparent or translucent tube or cylinder 16 having end closure members 18 and 20 fixed to and tightly sealing the opposite ends of tube 16. The closure members 18 and 20, prior to insertion of the container into the dehydrator casing, are imperforate so as to exclude moisture from the container; however, the closure members are subject to penetration by knives 22 and 24 incident to assembly of the dehydrator, or replacement of containers or cartridges such as 12. The openings 26 formed by the knives permit passage through the container, of a gas to be dehydrated.

The initially imperforate closure members 18 and 20 may embrace internal perforate screens 28, which serve to space from the closure members the filter pads 30, 30, between which is confined the bed or charge of desiccant particles 14. When the knives puncture the closure members 18 and 20, they usually displace the metal thereof inwardly on a curvature, as at 32, leaving large openings 26 in communication with the openings of screens 28.

The opposite ends of casing 10 are closed by end caps 34 and 36, which may be sealed against the casing by means of gasket rings 38. The end caps preferably are removable, and may have screw-threaded connections with the casing at 40 and 42. Posts 44 on end cap 34 provide projections to accommodate a wrench or bar to be used in turning the cap for removal or replacement, so that cartridges or containers 12 may be replaced when necessary. The cap 34 may carry the group of knives 22, fixed thereon by means of a screw 46 or otherwise.

Intermediate the end caps of casing 10 is fixed a transverse partition member or wall 48 adapted to support the knife 24. One face of wall 48 carries a circular gasket 50 which seals against that end of cartridge or container 12 which supports the closure member 20. The opposite face 52 of wall 48 furnishes edge support for a cylindrical filter 54 which depends into a chamber 56 intermediate the wall 48 and end cap 36. Filter 54 may be supported by means of a circular washer 58 having a threaded connection 60 with a suspension rod 62, which rod has a head 64 resting upon the hub of knife 24. Rod 62 depends through an opening 66 of wall 48. Opening 66 places the interior of filter 54 in communication with the openings 26 of the cartridge or container 12.

Air or gas to be dehydrated is introduced to entry chamber 56 through a suitable inlet port fitting 68, and circulates about a baffle 70 having a bottom opening 72 which directs the gas to and through the permeable circular wall of filter 54. From the interior of filter 54, the gas passes through opening 66 and enters the desiccant container or cartridge through the lower openings 26, screen 28, and the adjacent filter pad 30. In leaving the cartridge or container 12, the gas passes upwardly through upper screen 28 and openings 26 at the top thereof, and is directed through passageways 74 of cap 34, to a chamber 78 having an outlet port fitting 76 which releases the dehydrated gas for use as required. Dehydrated gas in the day gas chamber 78 is prevented from mixing with untreated gas entering the cartridge or container 12, by the seal provided at gasket 50.

Beneath the gas entry chamber 56 may be provided a well or sump 80 fitted with a drain cock 82, whereby condensate may be drained from the dehydrator casing when necessary.

In the preferred construction, the tubular body of the cartridge or container 12 is of transparent material, so that the desiccant therein is visible for the observance of changes that occur therein as the cartridge accumulates moisture from the incoming gas. The desiccant is of the molecular sieve type, and amongst the particles thereof are interspersed particles of a dew point indicating material, of which blue gel is an example. The blue gel particles change color from blue to pink progressively, as the particles gradually attract and entrap moisture from the gas passing through the molecular sieve or desiccant bed.

In a preferred form of the invention, FIGS. 1 through 4, the blue gel indicator particles, as distinguished from the molecular sieve particles, are interspersed indiscriminately or at random throughout the mass or bed of particles constituting the molecular sieve. Thus, blue gel particles will be found scattered through the desiccant bed at all elevations within the container or cartridge 12. Blue gel particles may constitute about 20 percent of the desiccant bed, by volume. In the drawing views, the shaded particles 14A denote blue gel particles or equivalent dew point color change indicating materials.

In the light of the foregoing, and with reference to FIG. 2, pressured gas to be dehydrated enters the apparatus at 68, passes through the primary filter 54 which removes foreign particles therefrom, and then progresses upwardly through the desiccant bed of cartridge or container 12 en route to the discharge port 76. The particles of desiccant and blue gel initially contacted by the gas will of course receive the most moisture from the gas, causing the involved blue gel to change color. At the higher elevations within the container, the desiccant and the moisture indicating particles will be largely unaffected, until the level of moisture within the desiccant bed rises due to prolonged exposure to the stream of wet gas fed into the dehydrator.

As the wet gas undergoing treatment continues to yield its moisture to the desiccant and the blue gel particles, the moisture level within the container rises, as does also the level of the color change of the blue gel particles. This is indicated upon FIG. 4, where X indicates a line of color change beneath which the blue gel particles are pink in color, indicating that the desiccant bed beneath the line is saturated with moisture. Above the line X, the blue gel particles will remain blue in color, to indicate a condition of relative dryness of the desiccant bed.

As gas continues to flow through the apparatus, the color line eventually will reach the extreme upper limit of the desiccant bed, exhibiting mostly a pink coloration of the blue gel, and thereby indicating that the desiccant has been spent and will no longer effectively remove moisture from the gas fed to the apparatus. The spent cartridge or container 12 may then be removed from casing 10, and replaced with a fresh one; or in the alternative, the spent cartridge or container may be reactivated, as follows.

According to FIG. 4, a pair of dehydrators may be joined in a system whereby the container 12 of one dehydrator, at the left in FIG. 4, may perform to dehydrate a gas fed thereto, while a similar container 12 of the remaining dehydrator, shown at the right in FIG. 4, undergoes reactivation or dehydration of its desiccant bed by the passage of dried air or other gas therethrough under pressure. A valve 84 may be employed to direct a gas requiring dehydration, to one or the other of the dehydrators in alternation, with the understanding that the dehydrator not in use for gas drying, will meanwhile be subjected to reactivation for subsequent use in the gas dehydration process. Reactivation restores the blue gel and the desiccant to original dry condition, at which the blue gel coloration turns from pink to blue.

The gradual advancement of the color line X toward the discharge end of the container 12, is readily observable through the transparent wall of the container and that of casing 10. Accordingly, there can be no uncertainty as to when the desiccant requires replacement or reactivation in order to prevent a discharge of wet gas from the dehydrator. Great advantage results from this arrangement, as it eliminates the need for bleeding, sampling, or monitoring the dehydrator at frequent intervals in order to determine its operating condition. The color line method also renders the gas dehydration procedure much safer, in circumstances wherein use of a wet gas obtainable from the apparatus, believing it to be dry, might have serious consequences.

If desired, electronic or photoelectric apparatus 86, 88, may be employed to sense the arrival of color line X at a predetermined elevation upon container 12. Such apparatus may energize a signal, or actuate means such as a valve 84, to terminate use of the spent dehydrator.

Figure 5:
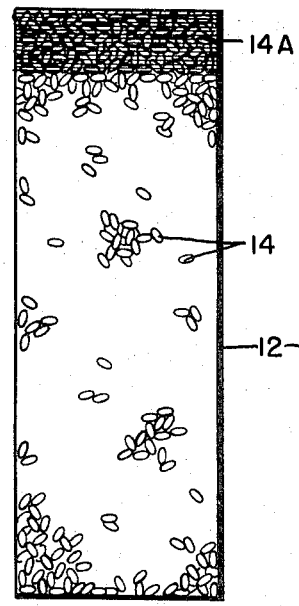
FIG. 5 is a side elevational view of a desiccant bed, incorporating means different from that of FIG. 4 for visually indicating the moisture content of the desiccant.

In the modified cartridge or container structure, FIG. 5, the color change dew point indicating particles 14A constitute a single band or layer at the upper or drier end of the cartridge or container. Thus, if the container of FIG. 5 were inserted into the casing of FIG. 2, the band or layer 14A would be at the top, or near the discharge port 76, and wet gas would pass upwardly through the desiccant 14 in the direction of band or layer 14A. The particles 14A, after passage of a sufficient amount of wet gas through the container, will eventually change color and thereby exhibit a visual indication of the fact that the desiccant is moisture saturated.

Figure 6:
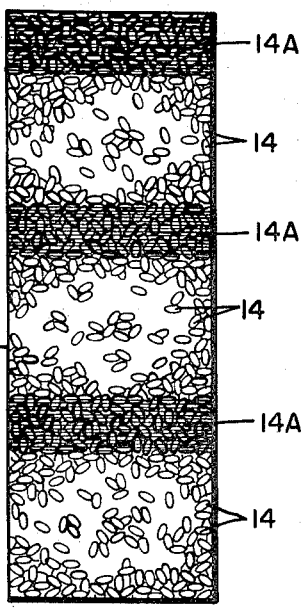
FIG. 6 is a view similar to FIG. 5, showing a modification of the indicator means of FIGS. 4 and 5.

FIG. 6 modifies FIG. 5 by adding several intermediate layers or bands of color change dew point indicating particles 14A, spaced from one another, so that an observer might have a progressive indication of the condition of the desiccant prior to a final reading. As in the case of FIG. 4, the color changes in the structures of FIGS. 5 and 6 may be sensed by means of suitable photoelectric or electronic apparatus 86, 88, or the equivalent thereof, for control purposes. The indication of desiccant condition is observable in stages according to FIGS. 5 and 6, whereas in FIGS. 2 and 4 the indication is progressively continuous.

In the several forms of the invention disclosed reference has been made to the molecular sieve as the principal drying agent or desiccant suggested for packing the container or cartridge 12. The invention contemplates also the use of a catalytic unit for removing moisture from gases, provided that such unit is adaptable for the inclusion of a color change dew point indicating material in accordance with the teaching herein. Any color change dew point indicating material suitable for the purpose of the invention may be employed as a substitute for blue gel.

The dehydrator of the present invention may be structurally simplified in certain respects, if desired, by omitting certain elements and their functions. For example, the primary mechanical filter 54 might be omitted, particularly if the gas to be dehydrated requires no such primary filtering, or obtains it in advance of entry into the dehydrator. Moreover, the container 12 instead of being removable as a cartridge, might be permanently built into casing 10, with elimination of the knife arrangement. In that event, the device after use might either be discarded, or subjected to reactivation as heretofore explained.

It is contemplated also, that container or cartridge 12 might be omitted entirely, so that chamber 78 of the transparent outer casing 10 might be packed with desiccant and color change dew point indicating material in accordance with the teachings of FIGS. 2, 4, 5 and 6.

It is to be understood that various other modifications and changes may be made in the structural details of the device, within the scope of the appended claims, without departing from the spirit of the invention.

What is claimed is:

1. A desiccant container for gas dehydrating equipment, comprising; a hollow elongated housing having inlet and outlet ends, said housing having a translucent portion extending over a major portion of the length thereof from the inlet to the outlet ends and affording visibility into said housing; a mass of particulate molecular sieve within and substantially filling said housing, said mass having the capacity to progressively adsorb moisture from the inlet toward the outlet ends, separate discrete particles of blue gel as a color change dew point indicating material interspersed throughout the mass of molecular sieve at all elevations therein and visible through the translucent portion of the hollow housing, the blue gel having the capacity to change color as the moisture is adsorbed by the molecular sieve, and means providing for the passage of a moist gas stream from the inlet to the outlet ends through the interior of the hollow housing and amongst the aforesaid particles therein, the particles of molecular sieve removing the moisture from the gas progressively toward the outlet end so that a dry gas is discharged therefrom up to the time the entire mass of molecular sieve is wetted, the removed moisture effecting a color change of the dew point indicating particles visible through the translucent portion of said housing continuously and progressively throughout the mass of molecular sieve as the moisture therein rises to the outlet end, thus providing a sight line denoting the extent of moisture which has been adsorbed and also the remaining portion of the particles that are dry thus giving an indication of the remaining life of the molecular sieve.

2. The desiccant container as specified by claim 1, in combination with a tubular elongate outer casing surrounding said container, said casing having an inlet port and a discharge port for moist gas fed thereto, said inlet port and said discharge port being in communication with the inlet and outlet ends, respectively of said container; said outer casing having a translucent portion in registry with the translucent portion of the desiccant container.

3. The desiccant container as specified by claim 1, wherein the hollow housing is tubular and includes end closure members sealing opposite ends of the hollow housing against access of air to the particles encased therein, and means puncturing said closure members to permit passage of a gas stream through the hollow housing from end to end thereof.

4. The desiccant container as specified by claim 3, wherein the entire tubular housing is formed of translucent material.

5. A dehydrator for gases, comprising in combination: an elongate outer casing having a side wall and opposite ends closing said casing, and an inner elongate container housed within said outer casing adjacent one of said closed ends, said inner container having opposite end closure members and a side wall, said side wall having a translucent portion intermediate said end closure members; a mass of desiccant in particle form, and particles of color change dew point indicating material, all sealed within the inner container and observable through the translucent portion thereof; means mounting said one of said closed ends of the outer casing for displacement, and providing for removal and replacement of the inner container relative to the outer casing; the side wall of said outer casing including a translucent portion in register with the translucent portion of the inner container; cutting means within the outer casing puncturing both opposite end closure members of the inner container upon mounting of said displaceable one end upon the outer casing to provide perforations therein, with the inner container lodged within the outer casing; the outer casing having a transverse wall therein dividing the interior into upper and lower chambers, the wall having an opening therein, said inner container in the upper chamber and in sealing engagement with said transverse wall around said opening, said opening communicating with the perforations in one end closure member, a filter element having a peripheral wall mounted within the lower chamber and having one end sealingly engaged with said wall around said opening and positioned so that the interior of the filter element leads to the opening, the other end of the filter element being closed, a baffle about the filter element having an opening adjacent the closed end of the filter element, the baffle surrounding and being spaced from the filter element and defining a flow space therebetween, an inlet opening in the outer casing communicating with the lower chamber, and an outlet opening in the outer casing communicating with the upper chamber and the other of the end closure members.

6. The dehydrator as specified by claim 5, wherein the particles of color change dew point indicating material are arranged as a layer overlying the mass of desiccant, said layer being visible through the translucent portions of the inner container and said outer casing.

7. The dehydrator as specified by claim 5, wherein the particles of color change dew point indicating material are arranged as spaced layers within the mass of desiccant, said layers being visible through the translucent portions of the desiccant container and said outer casing.

8. The dehydrator as specified by claim 5, wherein the color change dew point indicating particles are distributed throughout the mass of desiccant, and are separated from one another by the desiccant particles, said desiccant particles and interspersed dew point indicating particles being visible through the translucent portions of the inner container and said outer casting.

9. The dehydrator as specified by claim 8, wherein is included a filter interposed between the gas inlet port and that punctured end closure member which receives gas initially from the inlet port.

10. The dehydrator as specified by claim 9, wherein the combination includes means for the release of condensate from the outer casing.

* * * * *